United States Patent
Hamilton (10) Patent No.: US 10,175,690 B2
(45) Date of Patent: Jan. 8, 2019

(54) SYSTEMS AND METHODS FOR SATELLITE-BASED ON-BOARD AUTONOMOUS DEVICE DEACTIVATION

(71) Applicant: Echostar Technologies L.L.C., Englewood, CO (US)

(72) Inventor: Darren Hamilton, Castle Rock, CO (US)

(73) Assignee: Echostar Technologies International Corporation, Englewood, CO (US)

( * ) Notice: Subject to any disclaimer, the term of this patent is extended or adjusted under 35 U.S.C. 154(b) by 174 days.

(21) Appl. No.: 15/255,823

(22) Filed: Sep. 2, 2016

(65) Prior Publication Data

US 2018/0067485 A1 Mar. 8, 2018

(51) Int. Cl.
*G05D 1/00* (2006.01)
*B64C 39/02* (2006.01)
(Continued)

(52) U.S. Cl.
CPC ......... *G05D 1/0061* (2013.01); *B64C 39/024* (2013.01); *B64D 45/04* (2013.01);
(Continued)

(58) Field of Classification Search
CPC .. B05D 1/0061; G05D 1/0088; B64C 39/024; B64C 45/04; B64C 2201/141;
(Continued)

(56) References Cited

U.S. PATENT DOCUMENTS 5,646,845 A 7/1997 Gudat et al.
6,647,328 B2 11/2003 Walker
(Continued)

FOREIGN PATENT DOCUMENTS

CN 105 761 550 A 7/2016
EP 2840022 A1 2/2015
(Continued)

OTHER PUBLICATIONS

Beardow et al., The application of satellite communications technology to the protection of the rural distribution networks, 1993, IEEE, p. 17-20 (Year: 1993).*
Corso et al., Design of a University Nano-Satellite: the PiCPoT Case, 2011, IEEE, p. 1985-2007 (Year: 2011).*
Addaim et al., Design of Store and Forward Data Collection Low-cost Nanosatellite, 2007, IEEE, p. 1-10 (Year: 2007).*
(Continued)

*Primary Examiner* — McDieunel Marc
(74) *Attorney, Agent, or Firm* — Kilpatrick Townsend & Stockton LLP (57) ABSTRACT

Various arrangements relating to on-board autonomous device deactivation systems are presented. In some embodiments, a status signal is output to a transceiver and transmitted via a satellite antenna to a satellite. A timer is executed that indicates a time duration that has elapsed since receiving a previous permissible operation message via the transceiver and the satellite antenna. The time duration is compared with a stored deactivation time. Prior to the time duration reaching or exceeding the stored deactivation time, a permissible operation message indicative of the autonomous device being permitted to continue operation is received. In response to the receipt of such a permissible operation message, the time duration of the timer is reset such that operation of the autonomous device is uninterrupted. In some embodiments, if such a permissible operation message is not received, the autonomous device is disabled.

20 Claims, 5 Drawing Sheets

(51) Int. Cl.
*G07C 5/00* (2006.01)
*B64D 45/04* (2006.01)
*H04B 7/185* (2006.01)
*H04W 84/06* (2009.01)

(52) U.S. Cl.
CPC ........... *G05D 1/0088* (2013.01); *G07C 5/006* (2013.01); *G07C 5/008* (2013.01); *H04B 7/18508* (2013.01); *B64C 2201/141* (2013.01); *B64D 2221/00* (2013.01); *H04W 84/06* (2013.01)

(58) Field of Classification Search
CPC .... B64C 2221/00; G07C 5/006; G07C 5/008; H04B 7/18508; H04B 7/185; H04B 1/44; H04W 84/06
See application file for complete search history.

(56) References Cited

U.S. PATENT DOCUMENTS

| | | | |
|---|---|---|---|
| 7,856,294 | B2 | 12/2010 | Van Gaasbeck et al. |
| 7,856,629 | B2 | 12/2010 | Van Gaasbeck et al. |
| 8,391,375 | B2 | 3/2013 | Sammel, Jr. et al. |
| 8,588,830 | B2 | 11/2013 | Myer et al. |
| 9,871,577 | B2 * | 1/2018 | Haziza .............. H04B 7/18513 |
| 9,871,772 | B1 * | 1/2018 | Weinstein ........... H04L 63/0435 |
| 2010/0269143 | A1 | 10/2010 | Rabowsky |
| 2011/0162573 | A1 * | 7/2011 | Race ........................ H01Q 1/04 114/328 |
| 2012/0221175 | A1 | 8/2012 | Spinelli |
| 2014/0266674 | A1 | 9/2014 | Nye et al. |
| 2016/0275801 | A1 * | 9/2016 | Kopardekar ......... G08G 5/0043 |
| 2017/0155443 | A1 * | 6/2017 | Haziza ............... H04B 7/18513 |

FOREIGN PATENT DOCUMENTS

| | | |
|---|---|---|
| WO | 2009045213 A1 | 4/2009 |
| WO | 2016/122781 A1 | 8/2016 |

OTHER PUBLICATIONS

Hara et al., ORBCOMM low earth orbit mobile satellite communication system: US Armed Forces applications, 1993, IEEE, p. 710-724 (Year: 1993).*

International Search Report and Written Opinion for PCT/US2017/049700 dated Nov. 23, 2017, all pages.

Simic et al., "Investigation in wireless power transmission for UAV charging," Procedia Computer Science vol. 60 (2015) pp. 1846-1855, 19$^{th}$ International Conference on Knowledge Based and Intelligent Information and Engineering Systems, www.sciencedirect.com.

* cited by examiner

SYSTEMS AND METHODS FOR SATELLITE-BASED ON-BOARD AUTONOMOUS DEVICE DEACTIVATION

CROSS-REFERENCES TO RELATED APPLICATIONS

This Application is related to U.S. patent application Ser. No. 15/255,577, entitled "Systems and Methods for Updating Non-networked Autonomous Devices," filed on Sep. 2, 2016, the entire disclosure of which is hereby incorporated by reference for all purposes.

BACKGROUND

Autonomous devices, which can include unmanned aerial vehicles (UAVs), may operate in remote locations. In such locations, access to the Internet may be slow, intermittent, or entirely unavailable. Despite the limitations placed on communication, maintaining control and ensuring the safety of the autonomous device, members of the public, and property located in the vicinity of where the autonomous device functions may be necessary. Autonomous devices may be hacked, malfunction, be determined to be unsafe (e.g., due to a previous programming bug or error), or otherwise be determined by human-monitors to no longer be approved for field-operation.

SUMMARY

Various systems, devices, methods, a computer-readable mediums involving on-board autonomous device deactivation systems are presented. A satellite antenna may be used that allow for bidirectional communication with one or more satellites. Transceiver equipment may be present that receives and transmits encrypted message via the satellite antenna with the one or more satellites. One or more operation-control processors may be present that are in communication with the transceiver equipment and one or more components of an autonomous device on which the on-board autonomous device deactivation system resides. Such one or more processors may be configured to output a status signal to the transceiver equipment for transmission via the satellite antenna to the one or more satellites. The status signal may be encrypted and include an identifier indicative of the autonomous device and an indication of a status of the autonomous device. The one or more processors may be configured to execute a timer that indicates a time duration that has elapsed since receiving a previous permissible operation message via the transceiver equipment and the satellite antenna. The one or more processors may be configured to compare the time duration with a stored deactivation time. The one or more processors may be configured to prior to the time duration reaching or exceeding the stored deactivation time, receive, via the satellite antenna and the transceiver equipment, a permissible operation message indicative of the autonomous device being permitted to continue operation, wherein the permissible operation message comprises the identifier. The one or more processors may be configured to, in response to the permissible operation message, reset the time duration of the timer such that operation of the autonomous device is uninterrupted.

Embodiments of such arrangements may include one or more of the following features: After resetting the time duration, the one or more processors may be configured to: execute the timer that indicates the time duration has elapsed since receiving the permissible operation message, compare the time duration with the stored deactivation time; determine that the time duration has reached or exceeded the stored deactivation time prior to receiving a second permissible operation message; and in response to determining that the time duration has reached or exceeded the stored deactivation time prior to receiving the second permissible operation message, deactivate functionality of the autonomous device. The one or more operation-control processors being configured to deactivate functionality of the autonomous device may include the one or more operation-control processors transmitting a deactivation message to a control system of the autonomous device. The one or more operation-control processors being configured to deactivation functionality of the autonomous device may include the one or more operation-control processors activating a battery disconnect circuit that causes the one or more components of the autonomous device to deactivate. The autonomous device may be an unmanned aerial vehicle (UAV) and the one or more operation-control processors being configured to deactivation functionality of the autonomous device may include the one or more operation-control processors to initiate a controlled landing process. The transceiver equipment may be configured to receive and transmit messages using S-Band or L-Band satellite frequencies. The one or more processors may be configured to: receive a maintenance indication as part of the permissible operation message; and in response to the maintenance indication, initiate a maintenance timer that defines an amount of time which the autonomous device has to visit a maintenance device. The on-board autonomous device deactivation system may include a housing that isolates the transceiver equipment and the one or more operation-control processors from componentry of the autonomous device. The on-board autonomous device deactivation system may include an electrical communication path between the satellite antenna and the transceiver equipment which passes through the housing. The on-board autonomous device deactivation system may include an electrical output communication path from the one or more operation-control processors to the one or more components of the autonomous device, wherein the electrical output communication path passes through the housing.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Autonomous devices (ADs), which can include unmanned aerial vehicles (UAVs), unmanned ground vehicles (UGVs), and mobile autonomous robotic units (e.g., humanoid bipedal or otherwise self-propelled), may operate in remote locations. In such locations, access to the Internet may be slow, intermittent, or entirely unavailable. Therefore, ADs may not have continuous network access to communicate with a remote operator system or administrator system.

Despite the limitations placed on communication, maintaining control and ensuring the safety of the autonomous device, members of the public, and property located in the vicinity of where the autonomous device functions may be necessary. Autonomous devices may be hacked, malfunction, be determined to be unsafe (e.g., due to a previous programming bug or error), or otherwise be determined to no longer be approved for field-operation. A satellite communication link, which can be low bandwidth (e.g., using S-Band or L-Band satellite frequencies), may be used to periodically give an AD permission to continue operating via an on-board deactivation device. If an operation-positive message is not received within a defined time period, such as once per day, the AD's permission to continue operating may be revoked. If its operation permission is revoked, the AD may be powered down, deactivated, or caused to travel to a designated location.

Using the satellite communication link, the AD may periodically transmit status information. This status information may be used by a remote host or system connected with the remote host to determine if the AD should be permitted to continue operating autonomously, should be immediately deactivated, or should be instructed to travel to a maintenance device (such as a recharging station) within a defined period of time. The MD may have a higher communication bandwidth with a remote host, thus enabling significant amounts of data to be received from and/or transmitted to the AD, such as a software or firmware update.

Additional detail regarding the embodiments of the network-independent maintenance devices and the satellite-based platform used to provide the updates to the ADs is detailed in relation to FIGS. 1-6.

Figure 1:
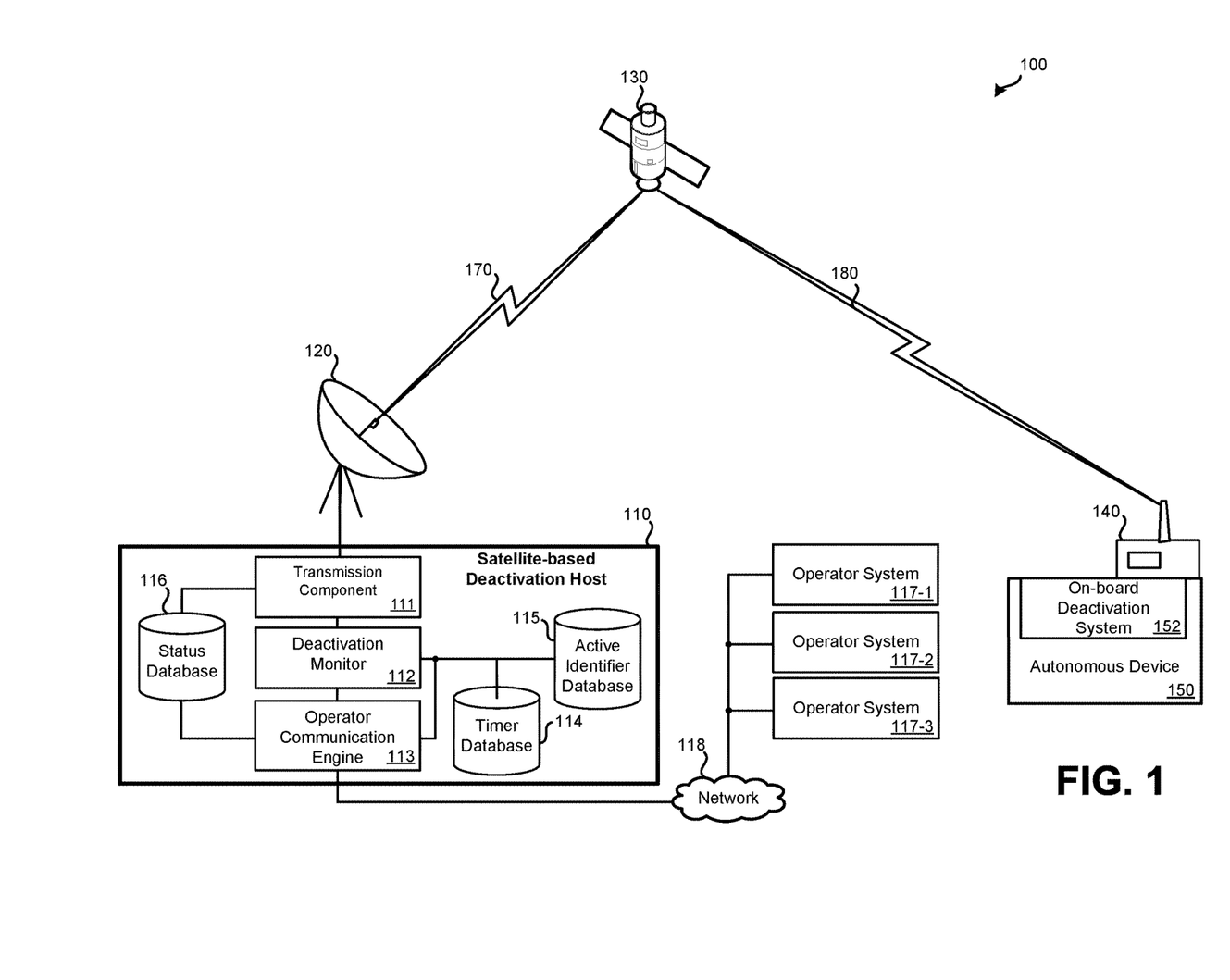
FIG. 1 illustrates an embodiment of a satellite-based deactivation system for monitoring and deactivating autonomous devices.

FIG. 1 illustrates an embodiment of a satellite-based deactivation system 100 for monitoring and deactivating autonomous devices. Satellite-based deactivation system 100 may include: satellite-based deactivation host 110, satellite transmitter equipment 120, satellite 130, satellite antenna 140, autonomous device (AD) 150, and operator systems 117. Alternate embodiments of satellite-based deactivation system 100 may include fewer or greater numbers of components. While only one satellite antenna 140 and AD 150 are illustrated, it should be understood that multiple (e.g., tens, thousands, millions of) instances of such equipment may receive and/or transmit data with satellite-based deactivation host 110 via satellite 130.

Satellite-based deactivation host 110 may include transmission component 111, deactivation monitor 112, operator communication engine 113, timer database 114, active identifier database 115, and status database 116. Active identifier database 115 may store identifiers that are associated with ADs that are to be permitted to continue operating. Each identifier in the active identifier may correspond to an on-board deactivation system that is associated with a particular AD (on which the on-board deactivation system resides or in which the on-board deactivation system is integrated, such as illustrated by on-board deactivation system 152 and AD 150). An operator of satellite-based deactivation host or a remote operator system of remote operator systems 117 may be permitted to activate and deactivate an AD by indicating whether an identifier linked with a particular AD in active identifier database 115 is activated and deactivated, or indicates maintenance is required.

Transmission component 111 may serve to format permissible operation messages and maintenance messages into a form appropriate for transmission by satellite transmitter equipment 120. In some embodiments, this formatting may include addressing the message using the identifier of the on-board deactivation system along with instructions that indicate the AD is permitted to keep operating and possibly indicating a period of time for which continued operation is authorized. Transmission component 111 may further perform any encryption and/or scrambling necessary to protect content of the permissible operation message private and/or such that only the on-board deactivation system to which the message is addressed receives and processes the permissible operation message or the maintenance message.

Timer database 114 may be used to monitor when a permissible operation message is to be transmitted to a particular on-board deactivation system. Timer database 114 may indicate: when a previous permissible operation message was broadcast associated with a particular on-board deactivation system and, if used, an indication of a timer period transmitted to the on-board deactivation system. Deactivation monitor 112 may periodically search timer database 114 for timers that are set to expire with a predefined period of time (e.g., within the next 12 hours). Deactivation monitor 112 may then consult active identifier database 115 to determine if the AD associated with the identifier is to be permitted to continue operation. If active identifier database 115 indicates that operation is to be permitted to continue, deactivation monitor 112 may trigger transmission component 111 to transmit a permissible operation message addressed to the identifier. To ensure reception by the associated on-board deactivation system, the permissible operation message may be transmitted multiple times, possibly within a predefined time window during which the on-board deactivation system is instructed to monitor for messages. In some embodiments, a duration of time may be included in the permissible operation message indicating a duration of time for which the AD is permitted to continue operating. This duration may be set by deactivation monitor 112 and/or an associated operator system, such as based on an analysis of status data associated with the AD or on-board deactivation system from status database 116. In some embodiments, this duration is not transmitted and a defined and stored duration is implemented by default by the on-board deactivation system in response to a received permissible operation message.

Status database 116 may be used if the satellite communication link via satellite 130 is bidirectional. If on-board deactivation systems, such as on-board deactivation system 152, can transmit status information to satellite-based deactivation host 110 via satellite 130, the on-board deactivation system may transmit system status information that is indicative of the operation of one or more components of the on-board deactivation system and/or the AD on which the on-board deactivation system resides. Status data received by satellite-based deactivation host 110 may be stored to status database 116. Information that may be stored in status database 116 may include data such as: a time/date stamp of last update, AD location, current firmware/software version, battery voltage, flight/travel plan or waypoints, sensor data, etc.

Operator communication engine 113 may serve to pass status data from status database 116 to an associated operator system of operator systems 117 (active identifier database 115 or some other database may relate operators with associated ADs and/or on-board deactivation systems). Operator systems 117 (which can include, for example, operator systems 117-1, 117-2, and 117-3) may be operated by entities that have one or more ADs distributed in the field. It should be understood that the presence of three operator systems 117 is merely an example. Fewer or greater numbers of operator systems may be in communication with operator communication engine 113 in other embodiments. Such operators may use satellite-based deactivation host 110 to deactivate and control their one or more ADs. Communication between operator systems 117 and operator communication engine 113 may occur via network 118, which can include one or more public (e.g., the Internet) and/or private networks (e.g., a corporate local area network). Operator systems 117 may be used to view and/or analyze status data from status database 116 for an operator's one or more ADs. Operator systems 117 may be used to send requests to operator communication engine 113 that indicates whether operation of an AD is permitted to continue and/or if an AD is requested to visit a maintenance device. Operator communication engine 113 may modify active identifier database 115 for an AD if the associated operator system indicates that the AD is to be disabled so as to receive maintenance. An AD may be permitted to continue operating autonomously unless a message to the contrary is received from an associated operator system by operator communication engine 113.

Satellite 130 may be configured to receive signals, such as permissible operation messages, from one or more satellite uplinks such as satellite transmitter equipment 120. Satellite 130 may relay received signals from satellite transmitter equipment 120 (and/or other satellite transmitter equipment) to multiple instances of ADs via transponder streams, such as using S-Band or L-Band satellite frequencies. Different frequencies may be used for uplink signal 170 from downlink transponder stream 180; uplink signal 170 may use a $K_A$ or $K_U$ band frequencies. Satellite 130 may be in geosynchronous orbit or a group of non-geosynchronous satellites may be used. Each of the transponder streams relayed by satellite 130 may contain multiple streams of update data transmitted as packetized data. For example, a single transponder stream may be a serial digital packet stream with a single satellite transmitting multiple transponder streams of data. Multiple satellites may be used to relay permissible operation messages from satellite-based deactivation host 110 to various instances of on-board deactivation systems residing on ADs, such as AD 150. Therefore, different streams of permissible operation messages may be transmitted via different satellites in various embodiments.

Figure 2:
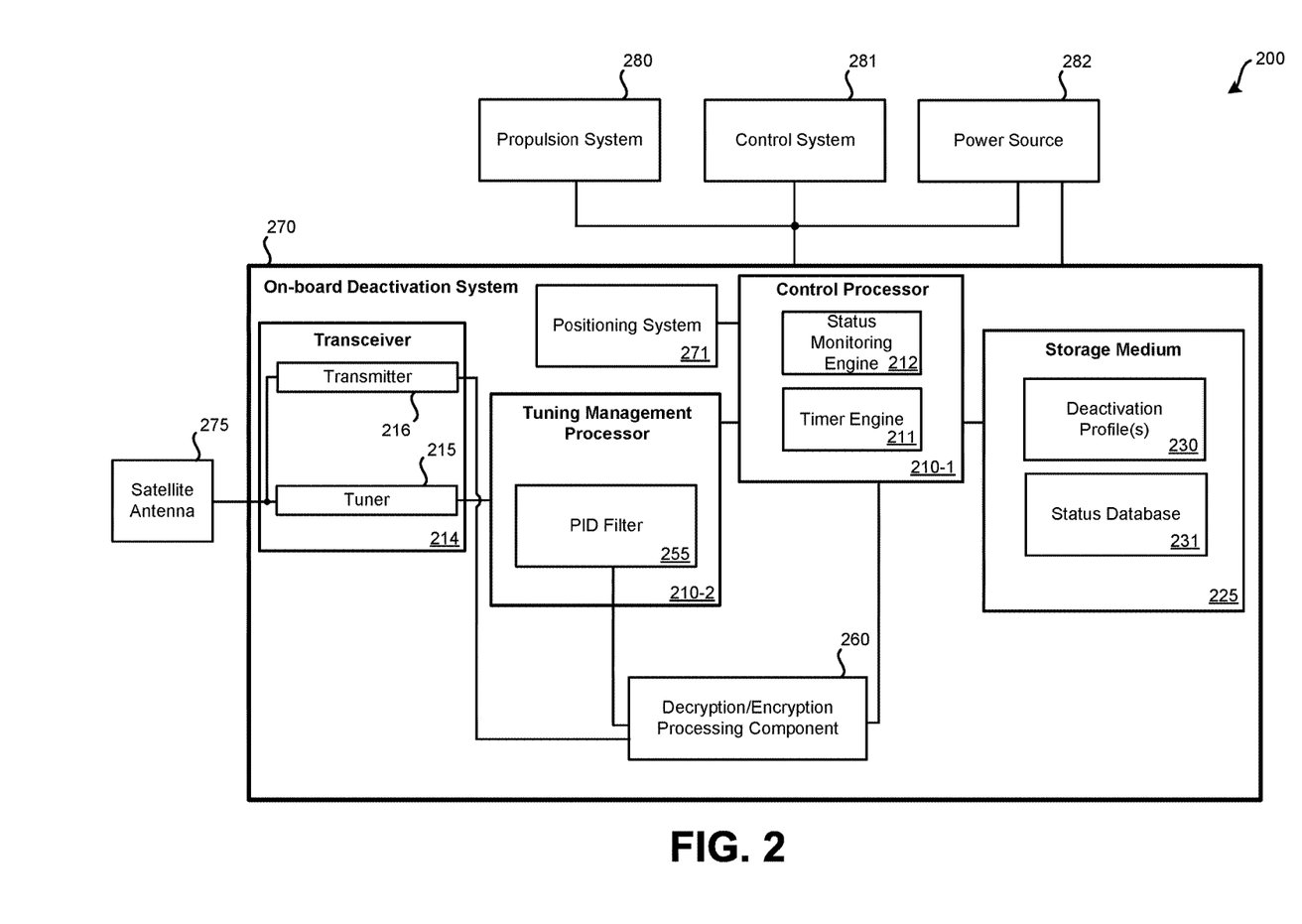
FIG. 2 illustrates an embodiment of an on-board deactivation device implemented on an autonomous device.

Satellite antenna 140 may be a piece of equipment that is used to receive transponder streams from one or more satellites, such as satellite 130. Satellite antenna 140, which may include one or more low noise blocks (LNBs), may be configured to receive transponder streams from multiple satellites and/or multiple transponders of the same satellite. The satellite antenna may be tunable to be able to receive transponder streams on multiple frequencies. For example, a tuner of on-board deactivation system 152 may only be able to tune to a single transponder stream from a transponder of a single satellite at a given time. The tuner can then be re-tuned to another transponder of the same or a different satellite. In some embodiments, satellite antenna 140 is only configured to receive data, such as in the S-Band or L-Band satellite frequencies. In other embodiments, the satellite antenna may also be used for transmitting data to satellite-based deactivation host 110 via satellite 130. FIG. 2 provides additional detail of various embodiments of on-board deactivation system 152.

Uplink signal 170 represents a signal between satellite transmitter equipment 120 and satellite 130. It should be understood that multiple uplink signals may be present. Each uplink signal may contain one or more data streams of permissible operation messages and/or other messages. For example, uplink signal 170 may be used to stream permissible operation messages for UAVs while a second uplink signal may be used to transmit permissible operation messages for UGVs. In some embodiments, the update streams may be at least partially encrypted and/or scrambled. Further, in addition to permissible operation messages, maintenance request messages may be transmitted to ADs via the arrangement of satellite-based deactivation system 100.

Downlink transponder stream 180 represents a transponder stream signal broadcast from satellite 130 to satellite antenna 140 (and, since it is a broadcast, potentially to many other satellite antennas connected with other MDs). Downlink transponder stream 180 may represent a relayed version of uplink signal 170, possibly being transmitted at a different frequency than at which uplink signal 170 was received.

FIG. 2 illustrates an embodiment 200 of an on-board deactivation device implemented on an autonomous device. In the illustrated embodiment 200, onboard deactivation system 270 is located onboard an AD. In FIG. 2, three components of the AD, on which onboard deactivation system 270 resides, are illustrated. These components are: propulsion system 280, control system 281, and power source 282. These three examples of AD components represent components with which onboard deactivation system 270 may communicate or which onboard deactivation system 270 may control.

Onboard deactivation system 270 (which can represent an example of on-board deactivation system 152) may be housed in a housing that isolates components of onboard deactivation system 270 from components of the AD on which the onboard deactivation system 270 resides. Onboard deactivation system 270 may have various inputs and outputs which can pass through the housing such that onboard deactivation system 270 can receive and, possibly, transmit data via satellite antenna 275, receive power from power source 282 of the AD, and control or deactivate various components of the AD, such as propulsion system 280, control system 281, and power source 282. Otherwise, onboard deactivation system 270 may be isolated from components of the AD on which it resides. Such an arrangement may prevent onboard deactivation system 270 from being hacked or otherwise disabled. In other embodiments, rather than being housed separately, onboard deactivation system 270 may be incorporated as part of an AD.

Onboard deactivation system 270 may be connected with an external satellite antenna 275 that permits data to be received and, possibly, transmitted to a satellite. Satellite antenna 140 of FIG. 1 represents a possible embodiment of satellite antenna 275. Satellite antenna 275 may be attached external to the AD in a location that permits reception from one or more satellites of the transmit messages to onboard deactivation system 270. Onboard deactivation system 270 may include tuner 215 as part of transceiver 214. Tuner 215 may permit one or more particular transponder streams to be received from a satellite via satellite antenna 275. And output of tuner 215 may be passed to a tuning management processor 210-2. Tuning management processor 210-2 may apply one or more filters, such as packet identifier (PID) filter 255 to a serial data stream output of tuner 215. PID filter may filter the received serial data stream such that only packets associated with the particular packet identifier are processed and passed to control processor 210-1 or decryption/encryption processing component 260. Other packets of the serial data stream may be ignored and discarded. Sense satellite antenna 275 may receive data that is being broadcast to many onboard deactivation systems, it can be assumed that the vast majority of data received as part of the serial data stream may be ignored by PID filter 255. That is, only a small portion of the data received via tuner 215 may be addressed specifically to onboard deactivation system 270.

In some embodiments, at least some of the data received via tuner 215 may be encrypted. Such data may be passed by tuning management processor 210-2 to a dedicated decryption/encryption processing component 260. Decryption/encryption processing component 260 may be in a form of a smart card which may or may not be removable from onboard deactivation system 270. Data that has been decrypted may be passed to control processor 210-1.

Control processor 210-1 may process any message received via tuner 215 that is addressed to onboard deactivation system 270. Control processor 210-1 may include a timer engine 211. Timer engine 211 may monitor a duration of time that has elapsed since a permissible operation message was last received. When a new permissible operation message is received, timer engine 211 may reset the duration of time that has elapsed since the previous permissible operation message was received. Timer engine 211 may also include a time duration threshold. If this threshold time duration is met or exceeded by the duration of time that has elapsed since the previous permissible operation message was received, control processor 210-1 may deactivate the AD. The threshold time duration may be defined in the permissible operation message that was previously received or may be a threshold time duration that is stored by the onboard deactivation system. For example, in some embodiments, 24 hours may be stored and used by the onboard deactivation system as the threshold time duration.

Control processor 210-1 may also execute status monitoring engine 212. Status monitoring engine 212 may gather status information from one or more components of the AD, such as propulsion system 280, control system 281, and power source 282, and/or may gather status information from one or more components of onboard deactivation system 270. Such status information may be periodically gathered by status monitoring engine 212 and stored to status database 231 on a non-transitory computer-readable storage medium 225.

If transceiver 214 is capable of bidirectional communication, control processor 210 may periodically transmit status information from status database 231 to the deactivation host system via transmitter 216 and satellite antenna 275. Decryption/encryption processing component 260 may be used to encrypt such status information for transmission by transmitter 216. In other embodiments, transmitter 216 may not be present and transceiver 214 may only be able to function as a receiver. Status information gathered by status monitoring engine 212 of control processor 210-1 may be stored in status database 231 and passed to another device via a different communication link. For example, as detailed in U.S. Pat. No. 10,002,468, entitled "Systems and Methods for Updating Non-networked Autonomous Devices", filed on the same day as this Application, the AD, on which onboard deactivation system 270 may reside, may intermittently visit a maintenance device (MD). Status data from status database 231 may be transmitted to the maintenance device which may, in turn, transmit the status data to a remote host, such as the deactivation host.

If control processor 210-1 does not receive a permissible operation message before the time duration since the previous permissible operation message has met or exceeded the threshold time duration, control processor 210-1 may cause the AD to deactivate or return to a particular waypoint or maintenance device. In some embodiments, control processor 210-1 may activate a switch which disconnects power source 282 of the AD from other componentry of the AD such as propulsion system 280 and control system 281. This may cause the AD to immediately stop functioning. In some embodiments, control processor 210-1 may transmit a message to control system 281 of the AD which instructs control system 281 to land the AD or otherwise stop moving. In still other embodiments, control processor 210-1 may have a direct communication link with propulsion system 280 of the AD. Control processor 210-1 may deactivate propulsion system 280 or may gradually decrease an amount of power supplied to propulsion system 280, thus rendering the AD immobile. Control processor 210-1 may have access to one or more deactivation profiles 230 stored by non-transitory computer-readable storage medium 225. Deactivation profiles 230 may define how control processor 210-1 is to disable the AD on which onboard deactivation system 270 is located and different deactivation profiles may be used in different situations. For example, if a permissible operation message is not received, a first deactivation profile of deactivation profiles 230 may be implemented by control processor 210-1. However, if a time period set by a maintenance message is violated, a second deactivation profile of deactivation profiles 230 may be implemented by control processor 210-1.

A maintenance message may be received as part of or in place of a permissible operation message. A maintenance message may set a time, during which the AD must visit a maintenance device. Control processor 210-1 may start a timer that monitors an amount of time that has elapsed since the maintenance messages have been received. This time may be distinct from the amount of time monitored since a previous permissible operation message. The maintenance message may also indicate a threshold maintenance time duration. If the threshold maintenance time duration elapses prior to the AD visiting a maintenance device, control processor 210-1 may deactivate the AD. In response to a maintenance message, control processor 210-1 may transmit a message to control system 281 of the AD that indicates the maintenance message has been received and the time duration during which the AD is required to visit the maintenance device. The maintenance message received by control processor 210-1 may also indicate a location of a maintenance device which is passed to control system 281. This location may be in the form of coordinates.

When the maintenance device is visited by the AD, onboard deactivation system 270 may receive a message indicating as such from control system 281 or may sense, such as via wireless communication, that the maintenance device has been visited. This visit may cause control processor 210-1 to deactivate any maintenance timer that is in operation. Status data from status database 231 may also be transmitted to the maintenance device.

Power source 282, which provides power to the AD may also be used to provide power to onboard deactivation system 270. In some embodiments, onboard deactivation system 270 has its own power source, such as an onboard battery. Power source 282 and/or any onboard power source of onboard deactivation system 270 may be recharged when the AD visits a maintenance device.

Control processor 210-1 may be in communication with positioning system 271. Positioning system 271 may be a global navigation satellite system receiver, such as a GPS receiver. Positioning system 271 may allow for onboard deactivation system 270 to be tracked independently of any positioning systems of the AD. If onboard deactivation system 270 is separately powered from the AD, control processor 210-1 may transmit a location obtained from positioning system 271 even if the AD is malfunctioning. Such an arrangement may be useful if the AD powers down unexpectedly or becomes otherwise nonfunctional.

Figure 3:
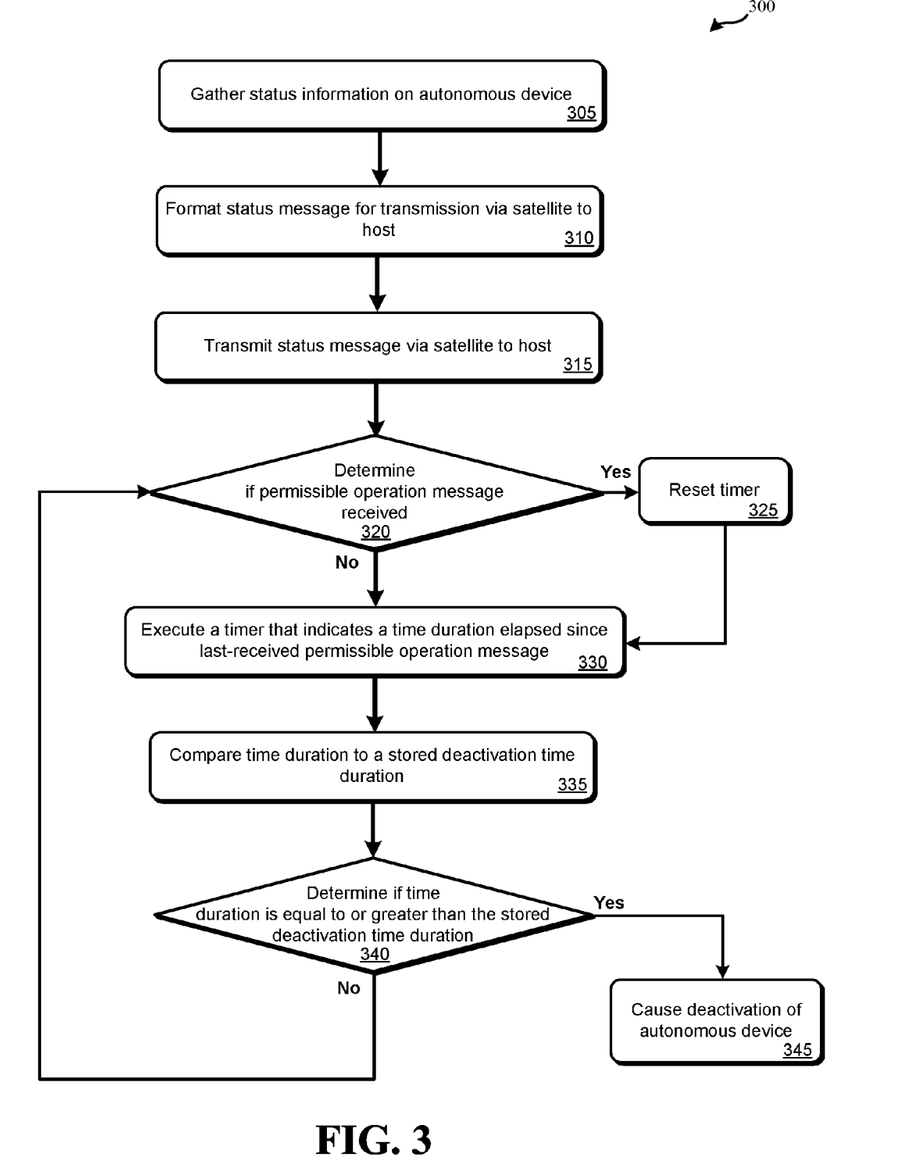
FIG. 3 illustrates an embodiment of a method for monitoring and deactivating an autonomous device.

Various methods may be performing using the systems and devices detailed in relation to FIGS. 1 and 2. FIG. 3 illustrates an embodiment of a method 300 for monitoring and deactivating an autonomous device. Method 300 may be performed using the systems and devices detailed in relation to FIGS. 1 and 2. Specifically, each step of method 300 may be performed by an on-board autonomous device deactivation system, such as an embodiment of onboard deactivation system 270 of FIG. 2.

Blocks 305 through 315 may be performed periodically. For example, blocks 305-315 may be performed daily. Further, blocks 305-315 may be performed independently of blocks 320-345. For example, blocks 320-345 may be performed more frequently than blocks 305-315. Further, performance of blocks 320-345 may be independent of blocks 305-315. At block 305, status information about an AD may be gathered by the on-board autonomous device deactivation system and/or about the on-board autonomous device deactivation system itself. Such status information can include: location, functionality checks of system components, a battery charge level, last visit to a maintenance device, a flight or travel plan, software and/or firmware version, any stored error or warning messages, etc. At block 310, if the on-board autonomous device deactivation system is capable of bi-directional communication with the satellite-based deactivation host, a message may be formatted to transmit some or all of the gathered status information of block 305 via satellite to the deactivation host. At block 315, one or more formatted status messages may be transmitted to the satellite-based host. Each message may include an identifier of the AD and/or the on-board autonomous device deactivation system.

At block 320, the on-board autonomous device deactivation system may determine if a permissible operation message addressed to the on-board autonomous device deactivation system has been received. The analysis of block 320 may determine if a permissible operation has been received since a last time block 320 was performed. In response to the analysis of block 320 being determined in the affirmative or in response to a permissible operation message being received, block 325 may be performed. At block 325, a timer is used to track an amount of time since a previous permissible operation message is reset. At block 330, which is performed after block 325 or in response to block 320 being determined in the negative, the timer may be executed to track a time duration that has elapsed since the last-received permissible operation message. In some embodiments, a timestamp is created when a permissible operation message is received and this timestamp can be used to compute a time duration that has elapsed since the last received permissible operation message.

At block 335, a comparison may be performed between the time duration of the time (or since the timestamp) and a stored deactivation threshold time duration. The stored deactivation threshold time duration may be a fixed value that is programmed into the on-board autonomous device deactivation system or may have been transmitted to the on-board autonomous device deactivation system in a previous or the last permissible operation message. Example of such a deactivation threshold time duration can be: 6 hours, 12 hours, 24 hours, 48 hours, etc. The deactivation threshold time duration may be set by an operator of the satellite-based deactivation host or an operator that administers the AD.

At block 340, if the time duration is determined to be equal to or greater than the stored deactivation time duration, method 300 may proceed to block 345. At block 345, the AD may be deactivated, such as by the on-board autonomous device deactivation system deactivating power to one or more components of the AD or issuing a command to a processor or control component of the AD. In some embodiments, the on-board autonomous device deactivation system may have multiple deactivation profiles stored. A deactivation profile may be implemented based on a defined rule of the on-board autonomous device deactivation system as to how the AD should be deactivated when the stored deactivation threshold time is met or exceeded. Returning to block 340, if the elapsed time duration since the last-received permissible operation message is less than the deactivation threshold time duration, method 300 may return to block 320 to reassess if a permissible operation message has been received.

Figure 4:
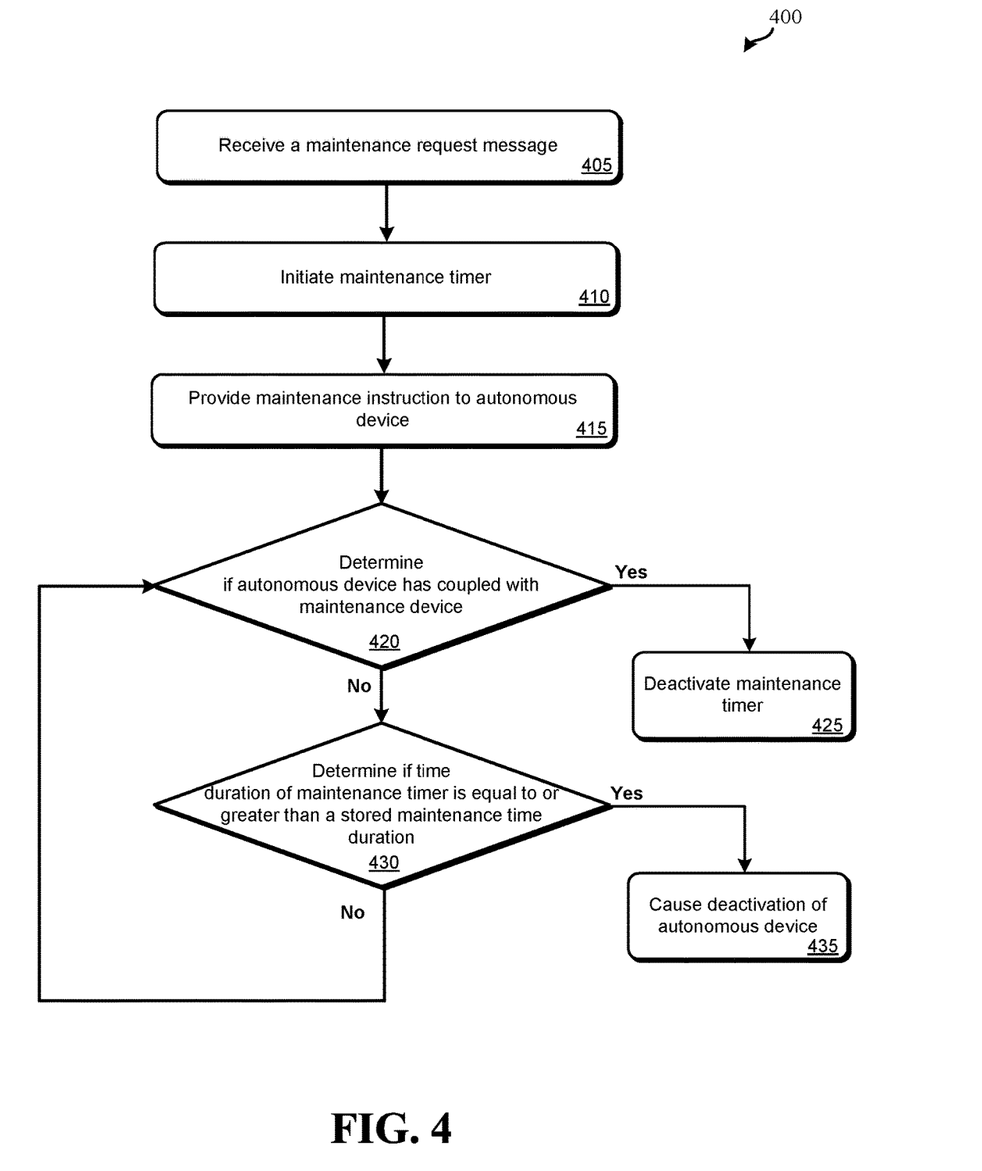
FIG. 4 illustrates an embodiment of a method for instructing an autonomous device to travel to a maintenance device and deactivating the autonomous device.

FIG. 4 illustrates an embodiment of a method for instructing an autonomous device to travel to a maintenance device and deactivating the autonomous device. Method 400 may be performed using the systems and devices detailed in relation to FIGS. 1 and 2. Specifically, each step of method 400 may be performed by an on-board autonomous device deactivation system, such as an embodiment of onboard deactivation system 270 of FIG. 2. Method 400 may be performed by an on-board autonomous device deactivation system that also performs method 300. For example, method 300 may be performed to process permissible operation messages received from a satellite-based deactivation host and method 400 may be performed to process maintenance request messages.

At block 405, a maintenance request message may be received by the on-board autonomous device deactivation system. The maintenance request message may include an indication of an identifier of the AD or the on-board autonomous device deactivation system. Based on the presence of the identifier, the on-board autonomous device deactivation system may process the received maintenance request message. Otherwise, the maintenance request message may be discarded. It should be understood that a maintenance request may be embedded as part of a permissible operation message. For example, a flag within a permissible operation message may be used as a maintenance request. In some embodiments a maintenance request message also includes an indication of a duration of time or fixed time by which the maintenance request is required to be completed.

At block 410, a maintenance timer may be initiated by the on-board autonomous device deactivation system. The maintenance timer may monitor the amount of time that has elapsed since the maintenance request message has been received. In some embodiments, block 410 may include creating a timestamp rather than initiating a timer. At block 415, an instruction may be transmitted by the on-board autonomous device deactivation system to a control system of the AD that instructs the AD that a maintenance request message has been received, and, if provided, the duration or fixed time by which the AD is required to complete the maintenance request. If the maintenance request message indicates a specific maintenance device which the AD is requested to visit, a location or indication of this maintenance device may also be transmitted to the control system of the AD.

At block 420, a determination may be made by the on-board autonomous device deactivation system as to whether the AD has coupled with the maintenance device, either wirelessly or via a wired connection. In some embodiments, the maintenance device may transmit a message directly to the on-board autonomous device deactivation system (e.g., via a wireless communication interface) indicative of the AD's visit to the maintenance device. In some embodiments, the control system of the AD may transmit a message to the on-board autonomous device deactivation system indicative of the visit. In still other embodiments, the on-board autonomous device deactivation system may sense that the maintenance device has been visited. In still other embodiments, the satellite-based deactivation host may broadcast a message to the on-board autonomous device deactivation system that indicates that the maintenance request has been fulfilled. If the determination at block 420 is in the affirmative, the timer may be deactivated at block 425 and an analysis of whether the AD should be deactivated due to a violation of a time duration associated with the maintenance request may be discontinued. If block 420 is determined in the negative, method 400 may proceed to block 430.

At block 430, the elapsed time of the maintenance timer (or the amount of time that has elapsed since the timestamp of block 410) may be compared with the stored maintenance threshold time duration, which may be a fixed value stored by the on-board autonomous device deactivation system or may have been indicated in the maintenance request message. If the time duration of the timer meets or exceeds the maintenance threshold time duration, block 435 may be performed. At block 435, the AD may be deactivated, such as by the on-board autonomous device deactivation system deactivating power to one or more components of the AD or issuing a command to a processor or control component of the AD. In some embodiments, the on-board autonomous device deactivation system may have multiple deactivation profiles stored. A deactivation profile may be implemented based on a defined rule of the on-board autonomous device deactivation system as to how the AD should be deactivated when the stored maintenance threshold time duration is met or exceeded. Returning to block 430, if the elapsed time duration since the maintenance request message is less than the stored maintenance threshold duration, method 400 may return to block 420 to continue monitoring for the AD visiting the maintenance device (or other form of maintenance location).

Figure 5:
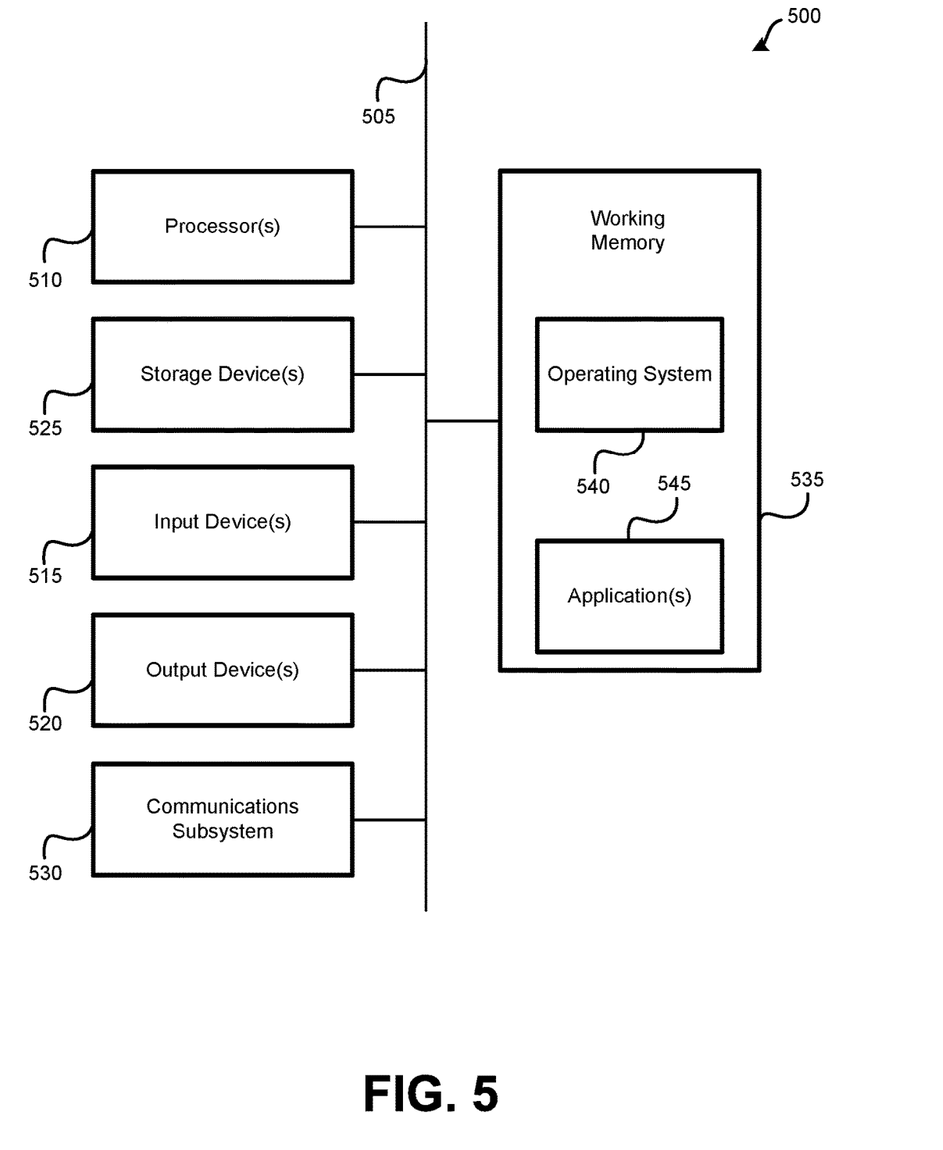
FIG. 5 illustrates an embodiment of computerized componentry that can be incorporated as part of the satellite-based deactivation system, the on-board deactivation system, the autonomous device, and/or the maintenance device.

FIG. 5 illustrates an embodiment of computerized componentry that can be incorporated as part of the satellite-based deactivation systems, the on-board deactivation systems, the autonomous devices, and/or the maintenance devices detailed herein. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a touchscreen, keyboard, remote control, and/or the like; and one or more output devices 520, which can include without limitation a display device, a printer, etc.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An on-board autonomous device deactivation system comprising:
   a satellite antenna that allow for bidirectional communication with one or more satellites;
   transceiver equipment that receives and transmits encrypted message via the satellite antenna with the one or more satellites;
   one or more operation-control processors that are in communication with the transceiver equipment and one or more components of an autonomous device on which the on-board autonomous device deactivation system resides, the one or more operation-control processors being configured to:
      output a status signal to the transceiver equipment for transmission via the satellite antenna to the one or more satellites, wherein the status signal is encrypted and comprises an identifier indicative of the autonomous device and an indication of a status of the autonomous device;
      execute a timer that indicates a time duration that has elapsed since receiving a previous permissible operation message via the transceiver equipment and the satellite antenna;
      compare the time duration with a stored deactivation time;
      prior to the time duration reaching or exceeding the stored deactivation time, receive, via the satellite antenna and the transceiver equipment, a permissible operation message indicative of the autonomous device being permitted to continue operation, wherein the permissible operation message comprises the identifier; and
      in response to the permissible operation message, reset the time duration of the timer such that operation of the autonomous device is uninterrupted.

2. The on-board autonomous device deactivation system of claim 1, wherein the one or more operation-control processors are further configured to, after resetting the time duration:
   execute the timer that indicates the time duration has elapsed since receiving the permissible operation message;
   compare the time duration with the stored deactivation time;
   determine that the time duration has reached or exceeded the stored deactivation time prior to receiving a second permissible operation message; and
   in response to determining that the time duration has reached or exceeded the stored deactivation time prior to receiving the second permissible operation message, deactivate functionality of the autonomous device.

3. The on-board autonomous device deactivation system of claim 2, wherein the one or more operation-control processors being configured to deactivate functionality of the autonomous device comprises the one or more operation-control processors transmitting a deactivation message to a control system of the autonomous device.

4. The on-board autonomous device deactivation system of claim 2, wherein the one or more operation-control processors being configured to deactivation functionality of the autonomous device comprises the one or more operation-control processors activating a battery disconnect circuit that causes the one or more components of the autonomous device to deactivate.

5. The on-board autonomous device deactivation system of claim 2, wherein the autonomous device is an unmanned aerial vehicle (UAV) and the one or more operation-control processors being configured to deactivation functionality of the autonomous device comprise the one or more operation-control processors to initiate a controlled landing process.

6. The on-board autonomous device deactivation system of claim 1, wherein the transceiver equipment is configured to receive and transmit messages using S-Band or L-Band satellite frequencies.

7. The on-board autonomous device deactivation system of claim 1, wherein the one or more operation-control processors are further configured to:
   receive a maintenance indication as part of the permissible operation message; and
   in response to the maintenance indication, initiate a maintenance timer that defines an amount of time which the autonomous device has to visit a maintenance device.

8. The on-board autonomous device deactivation system of claim 1, further comprising:
   a housing that isolates the transceiver equipment and the one or more operation-control processors from componentry of the autonomous device.

9. The on-board autonomous device deactivation system of claim 8, further comprising:
   an electrical communication path between the satellite antenna and the transceiver equipment which passes through the housing; and
   an electrical output communication path from the one or more operation-control processors to the one or more components of the autonomous device, wherein the electrical output communication path passes through the housing.

10. A method for using an on-board autonomous device deactivation system, comprising:
    outputting a status signal to a transceiver for transmission via a satellite antenna to a satellite, wherein the status signal is encrypted and comprises an identifier indicative of an autonomous device on which the on-board autonomous device deactivation system is installed and an indication of a status of the autonomous device;
    executing a timer that indicates a time duration that has elapsed since receiving a previous permissible operation message via the transceiver and the satellite antenna;
    comparing the time duration with a stored deactivation time;
    prior to the time duration reaching or exceeding the stored deactivation time, receiving, via the transceiver from the satellite, a permissible operation message indicative of the autonomous device being permitted to continue operation, wherein the permissible operation message comprises the identifier; and
    in response to the permissible operation message, resetting the time duration of the timer such that operation of the autonomous device is uninterrupted.

11. The method for using the on-board autonomous device deactivation system of claim 10, further comprising:
    executing the timer that indicates the time duration has elapsed since receiving the permissible operation message;
    comparing the time duration with the stored deactivation time;

determining that the time duration has reached or exceeded the stored deactivation time prior to receiving a second permissible operation message; and in response to determining that the time duration has reached or exceeded the stored deactivation time prior to receiving the second permissible operation message, deactivating functionality of the autonomous device.

12. The method for using the on-board autonomous device deactivation system of claim 11, wherein deactivating functionality of the autonomous device comprises transmitting a deactivation message to a control system of the autonomous device.

13. The method for using the on-board autonomous device deactivation system of claim 11 wherein deactivating functionality of the autonomous device comprises activating a battery disconnect circuit that causes one or more components of the autonomous device to power down.

14. The method for using the on-board autonomous device deactivation system of claim 11, wherein the autonomous device is an unmanned aerial vehicle (UAV) and deactivating functionality of the autonomous device comprises initiating a controlled landing process.

15. The method for using the on-board autonomous device deactivation system of claim 10, further comprising transmitting, by the transceiver, the status signal using S-Band or L-Band satellite communication frequencies.

16. The method for using the on-board autonomous device deactivation system of claim 10, wherein the on-board autonomous device deactivation system is housed in a housing that isolates the transceiver and one or more processors from componentry of the autonomous device.

17. The method for using the on-board autonomous device deactivation system of claim 10, further comprising:
receiving a maintenance indication as part of the permissible operation message; and
in response to the maintenance indication, initiating a maintenance timer that indicates an amount of time that has elapsed since receiving the maintenance indication requesting the autonomous device visit a maintenance device.

18. The method for using the on-board autonomous device deactivation system of claim 17, further comprising:
determining that the amount of time of the maintenance timer has reached or exceeded a maintenance threshold time period; and
in response to determining that the time of the maintenance timer has reached or exceeded the maintenance threshold time period, deactivating functionality of the autonomous device.

19. A non-transitory processor-readable medium for using an on-board autonomous device deactivation system, comprising processor-readable instructions that cause one or more processors of the on-board autonomous device deactivation system to:
output a status signal to a transceiver for transmission via a satellite antenna to a satellite, wherein the status signal is encrypted and comprises an identifier indicative of an autonomous device on which the on-board autonomous device deactivation system is installed and an indication of a status of the autonomous device;
execute a timer that indicates a time duration that has elapsed since receiving a previous permissible operation message via the transceiver and the satellite antenna;
compare the time duration with a stored deactivation time;
prior to the time duration reaching or exceeding the stored deactivation time, receive, via the transceiver from the satellite, a permissible operation message indicative of the autonomous device being permitted to continue operation, wherein the permissible operation message comprises the identifier; and
in response to the permissible operation message, reset the time duration of the timer such that operation of the autonomous device is uninterrupted.

20. The non-transitory processor-readable medium for using the on-board autonomous device deactivation system of claim 19, wherein the processor-readable instructions, when executed, further cause the one or more processors to:
execute the timer that indicates the time duration has elapsed since receiving the permissible operation message;
compare the time duration with the stored deactivation time;
determine that the time duration has reached or exceeded the stored deactivation time prior to receiving a second permissible operation message; and
in response to determining that the time duration has reached or exceeded the stored deactivation time prior to receiving the second permissible operation message, deactivate functionality of the autonomous device.

* * * * *